United States Patent
Chen et al.

(10) Patent No.: US 6,731,220 B2
(45) Date of Patent: May 4, 2004

(54) STRONG SHAKING JUDGMENT DEVICE AND METHOD

(75) Inventors: Chung-Chu Chen, Taichung (TW); Chien-An Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 101 days.

(21) Appl. No.: 10/112,714

(22) Filed: Apr. 2, 2002

(65) Prior Publication Data

US 2003/0184445 A1 Oct. 2, 2003

(51) Int. Cl.$^7$ ............................................. G08B 21/00
(52) U.S. Cl. ..................... 340/690; 340/683; 340/689; 340/669; 340/601; 340/540
(58) Field of Search ................. 340/601, 690, 340/669, 600, 540, 683, 689; 73/654, 649; 72/15

(56) References Cited

U.S. PATENT DOCUMENTS

| | | |
|---|---|---|
| 4,165,503 A | 8/1979 | Holmes et al. |
| 4,253,164 A | 2/1981 | Hall, Jr. |
| 4,333,029 A | 6/1982 | Kolm et al. |
| 4,361,740 A | 11/1982 | Stockdale |
| 4,382,449 A | 5/1983 | Nelson |
| 4,662,225 A * | 5/1987 | Koh et al. .................. 340/601 |
| 4,972,595 A | 11/1990 | Shimamura et al. |
| 5,101,195 A * | 3/1992 | Caillat et al. ................ 340/690 |
| 5,408,457 A | 4/1995 | Fujino et al. |
| 5,490,062 A * | 2/1996 | Leach et al. ................. 364/421 |
| 5,742,235 A | 4/1998 | Miche |
| 5,823,223 A | 10/1998 | Franklin et al. |
| 5,929,767 A * | 7/1999 | Wallick ....................... 340/690 |

\* cited by examiner

*Primary Examiner*—Jeffery Hofsass
*Assistant Examiner*—Hung Nguyen
(74) *Attorney, Agent, or Firm*—Birch, Stewart, Kolasch & Birch, LLP

(57) ABSTRACT

A strong shaking judgment method and device can use earthquake data recorded at all places in the world to process strong shaking waveform analysis in order to attain strong shaking characteristic parameters. These parameters are used as judgment standards of a strong shaking. A strong shaking judgment method according to the invention is described as follows: first, calculate and analyze every kind of earthquake characteristic parameter, such as a maximum acceleration value, number of times for passing over acceleration threshold, maximum velocity, maximum displacement, shaking energy index and shaking frequency, from acceleration change in a certain preset time frame. Next, use these six parameters to process a strong shaking judgment. A strong shaking judgment device can use a battery module, acceleration sensor module, micro controller module, alarm output module and state display module. The device in coordination with the method mentioned above can process a strong shaking judgment.

11 Claims, 6 Drawing Sheets

STRONG SHAKING JUDGMENT DEVICE AND METHOD

FIELD OF THE INVENTION

The invention relates to a strong shaking judgment device and method, and more particularly to a device and method used to judge a strong shaking using judgment logic.

BACKGROUND OF THE INVENTION

Earthquakes cannot be predicted and they cause tremendous casualties and property loss. The big earthquake that happened in Taiwan on Sep. 21, 1999 is a distinct example. In this disaster, there were many causes of casualties and losses, such as buildings collapsing, gas explosions or fire caused by the rupture of electrical wires, or property loss caused by precision instruments being disabled. In order to avoid such casualties and losses, the architectural design of buildings must focus on increasing strength, and other factors such as gas and electrical facilities can be provided with an earthquake warning device and switched-off through a proper method. Therefore, how to build a dependable strong shaking judgment method, applicable to microcomputer gas meters, mass transit systems, precision instruments, etc., that can emit a strong shaking warning signal and shut down the power supply of facilities to avoid greater casualties in order to lessen the losses of personnel and properties when a strong shaking happens is an important research today.

A seismic sensor applied on a gas meter is disclosed in U.S. Pat. No. 5,408,457. The method that this patent reveals is to hang a steel ball in a space. The displacement of the steel ball causes its upper circuit to yield an On-Off signal when a shaking happens. This signal can be used to represent the occurrence of a shaking. The greatest benefit of this method is that its structure is simple and little electricity is consumed (almost without consumption of electricity). However, the biggest shortcoming is that it cannot measure the strength of an earthquake accurately. Therefore, judgment logic must be used in coordination with such a method to judge the occurrence of the earthquake accurately. In addition, it is easy to misjudge because the shaking comes from the outside, piping is too long and the device is disposed in a tall building.

Another research in Taiwan proposes an earthquake judgment logic device utilizing a steel ball type seismic sensor. Its earthquake judgment mainly rests on taking a total time length of earthquake signals, shaking period numbers and the time length of each period as characteristic values of earthquake judgment to form a judgment logic table. The greatest benefit of this method is that a microcomputer controlled circuit saves a lot of work after the table of the judgment logic is constructed. However, it also has the shortcoming of the steel ball type switch mentioned above. Besides, this kind of judgment logic is not necessarily suitable for use everywhere because earthquake modes at different places are not exactly the same.

It can be known from the earthquake characteristics proposed by Douglas P. Arduini in his paper "Smart sensor requirements for second generation seismic gas shut-off valves" that a vertical shaking wave (p-wave) has faster wave transmission speed than a horizontal wave (s-wave) when an earthquake occurs. Moreover, the shaking strength and destructiveness of a p-wave is also far smaller than that of an s-wave. Therefore, the micro type shaking switch designed in the semiconductor manufacturing process for exploring the earthquake wave in the vertical direction disclosed in U.S. Pat. No. 5,742,235 is used to avoid earthquake casualties. The benefits of this patent are that it is very simple in structure and the elements are cheap. But, in fact, according to earthquake strength data the strength of p-waves in general is very small (approximately 0.01 g). Therefore, misjudgment is easy if earthquake judgment only rests on earthquake sensing in a single perpendicular direction. Therefore, it is proper that other earthquake judgment methods are included.

A fluid type seismic sensor disclosed in U.S. Pat. No. 4,165,503 can be used to measure a shaking and linear acceleration. Sensing mass and sensing fluid are used to act together on a pressure transformer to yield a telecommunication output equal to G value. The design of this sensor can be suitable for use in a broad G value range; it is limited to the maximum value on the reading table. The biggest difference between this design and the traditional design is the method that action transforms into pressure output. Net pressure yielded from the fluid and sensed by the sensing mass can be read through the pressure transformer. It is directly proportional to acceleration load.

A multifunctional earthquake transformer is disclosed in U.S. Pat. No. 4,253,164. The response characteristics and transfer function of its output signal can be changed arbitrarily in order to duplicate a transfer function needed for another seismic sensor. This change can be processed at a measurement site. The invention provides a transfer function shaping filter. The central frequency of the shaping filter can be adjusted to the natural frequency of the seismic sensor. The parameters of the filter can be designed to be adjustable in order to be in coordination with the damping effect and phase response of the seismic sensor. The transfer function of the invention comprises a first transfer function of a first sensor (accelerometer or hydrophone) in order to be in coordination with a second transfer function of a second sensor (geophone).

A seismic sensor for intrusion detection disclosed in U.S. Pat. No. 4,333,029 includes a base, a cantilever member of piezoelectric construction extending from the base, and a mass loading the end of the cantilever member separate from the base. The base defines a slot for receiving the end of the cantilever member, and holes, perpendicular to the slot, for receiving electrical conductors. These conductors are configured to orient the cantilever member at 45 degrees relative to the horizontal plane, providing sensing in both the X direction and the Y direction. A housing encloses the sensor, and another leg extends from the housing at the end separate from the base, enhancing the mechanical coupling between the sensor and the surface on which it is supported.

A seismic sensor disclosed in U.S. Pat. No. 4,361,740 essentially consists of a central annular member having an inner conductive periphery. The annular member is coaxially positioned around a center post located in a housing. The center post has four extending surface slots into which are inserted tines or upstanding flanges associated with first and second contact members. The contact members enable the sensor to be mounted in four distinct positions.

A method disclosed in U.S. Pat. No. 5,823,223 is to place a blocking trip ball on a small tray. When an earthquake is beyond the preset allowable range, the trip ball slides out from the small tray and drops into a piping to block the pipe. It not only is simple in structure, but also the shape and size of the small tray can be adjusted if necessary.

An inclined sensor disclosed in U.S. Pat. No. 4,972,595 is a single shaft sensor. It is mainly used to alleviate the problem that the volume is too large for a traditional inclined sensor in order to be disposed in a car. The traditional inclined sensor is a long horizontal shaft, and it must have a definite length in order to increase sensitivity. A valley type groove is designed in the invention, and a circle is placed at the bottom of the valley. The circle climbs upward along a slope, and a sensor on the slope senses the inclined angle when inclination occurs. This sensor can be inlayed in a circuit board of a car.

An earthquake emergency shut-off valve is disclosed in U.S. Pat. No. 4,382,449. It mainly installs a movable magnet outside a pipe. The magnet is used to drive a steel ball inside the piping; its front end leans against a spring switch. The magnet falls off the spring switch to lead the steel ball inside the pipe to shut off the valve.

The patents relating to earthquake judgment and blocking technology mentioned above all cannot consider on every possible situation of an earthquake judgement. For instance, if a detected shaking is emitted from a drilling machine, in fact, it is noise; or the effect of a small earthquake on the upper levels of a building and on the lower levels of a building is different. Besides, as to earthquake judgment logic, the above-mentioned technology use an acceleration parameter yielded from earthquake to judge an earthquake, an overall consideration to different attributes isn't done as well. That is to say, how to develop an earthquake judgment method that can consider the height factors of different building layers and noise generation in order to avoid misjudgment caused from outside interference (vibration frequencies of a earthquake are at 0–20 Hz), factor in influences caused by earthquakes of different energy levels, and judge immediately and shut off gas and electricity facilities is an important research topic.

SUMMARY OF THE INVENTION

The object of the invention is to provide a strong shaking judgment method used to analyze earth acceleration waveform change and judge a strong shaking.

Another object of the invention is to provide a strong shaking judgment method and device used to improve the traditional On-Off type seismic sensor and the shortcomings of misjudgment caused by the traditional strong shaking judgment method.

Another object of the invention is to provide a strong shaking judgment method and device that factors in the influence of magnification effects of building height on acceleration, velocity and displacement to be removed by using modification parameters to tall buildings. Especially in low frequency earthquakes, the acceleration on the earth's surface is 0.2 g; it is probably 0.6 g at the 12th building layer.

Accordingly, the invention provides a strong shaking judgment method enabling data of an acceleration threshold, energy index upper limit, middle limit and lower limit to be calculated according to data of maximum acceleration and shaking energy index obtained at a seismic event. Thus, when a shaking occurs the device and method of the invention can determine whether it is an earthquake by using the above-mentioned data. The method comprises the following steps: sample the acceleration of the shaking to obtain a maximum acceleration, calculate the energy of the shaking to obtain energy value, compare the maximum acceleration with an acceleration threshold and both energy value and energy index to obtain a strong shaking judgment index. Thereafter, a strong shaking can be judged according to the strong shaking judgment index.

The strong shaking judgment index can be obtained according to the following judgment rules: the strong shaking judgment index is assigned to the occurrence of a strong shaking when the measured maximum acceleration is greater than the upper limit of the acceleration threshold and the energy value is greater than the lower limit of the energy index lower limit. On the other hand, the strong shaking judgment index is assigned to non-occurrence of a strong shaking if the energy value is smaller than the energy lower limit.

The strong shaking judgment index is assigned to the occurrence of a strong shaking when the measured maximum acceleration is smaller than the upper limit of the acceleration threshold but greater than the middle limit, and the energy value is greater than the middle limit of the energy index. But, a first conditional earthquake judgment is processed if the energy value is smaller than the middle limit of the energy index but greater than the lower limit. The strong shaking judgment index is assigned to the non-occurrence of a strong shaking if the energy value is not only smaller than the middle limit of the energy index, but also smaller than the lower limit.

The strong shaking judgment index is assigned to the occurrence of a strong shaking when the maximum acceleration is smaller than the middle limit of the acceleration threshold and the energy value is greater than the upper limit of the energy index. But, a second conditional earthquake judgment is processed if the energy value is smaller than the upper limit of the energy index but greater than the middle limit. A third conditional earthquake judgment is processed if the energy value is smaller than the middle limit of the energy but greater than the lower limit. The strong shaking judgment index is assigned to non-occurrence of a strong shaking if the energy value is not only smaller than the middle limit of the energy index but also smaller than the lower limit of it.

The conditional earthquake judgments mentioned above can set a safe zone judgment. For example, increase a specified proportion of the maximum safe displacement or the maximum safe velocity as a judgment value, such as 60 percent. Being not in the safe zone is judged if this specified judgment value is exceeded, i.e. a strong shaking happens.

Besides, other judgment rules can be added, for example including a low-pass filtering step. The strong shaking judgment is stopped if the shaking frequency is greater than the low-pass filtering frequency, but the comparison steps are processed only if the shaking frequency is smaller than the low-pass frequency filtering frequency.

Additionally, the invention can use the maximum velocity and the maximum displacement indexes to judge the occurrence of a strong shaking, and these two indexes can be calculated through acceleration values. Therefore, the following judgment steps can be added: the strong shaking judgment index is assigned to the occurrence of a strong shaking if the maximum displacement is greater than the maximum safe distance. Comparisons are processed between the maximum acceleration value and the acceleration threshold, and between the energy value and the energy index if the maximum velocity is smaller than the maximum safe velocity and the maximum displacement is smaller than the maximum safe displacement.

Meanwhile, for putting the above-mentioned method into practice, the invention also provides a strong shaking judgment device. It is made according to the strong shaking judgement method which comprises: a battery module used to provide electricity for the device, an acceleration sensor module used to sense shaking acceleration value and calculate an energy value, a micro controller module which comprises an earthquake sensing program used to receive the acceleration values mentioned above and compare the maximum acceleration threshold value with the acceleration value and the shaking energy index with the energy value, an alarm output module used to receive a warning signal and to send out an alarm, and a state display module used to receive a state signal and to display the state of the device.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DETAILED DESCRIPTION OF THE INVENTION

Figure 1:
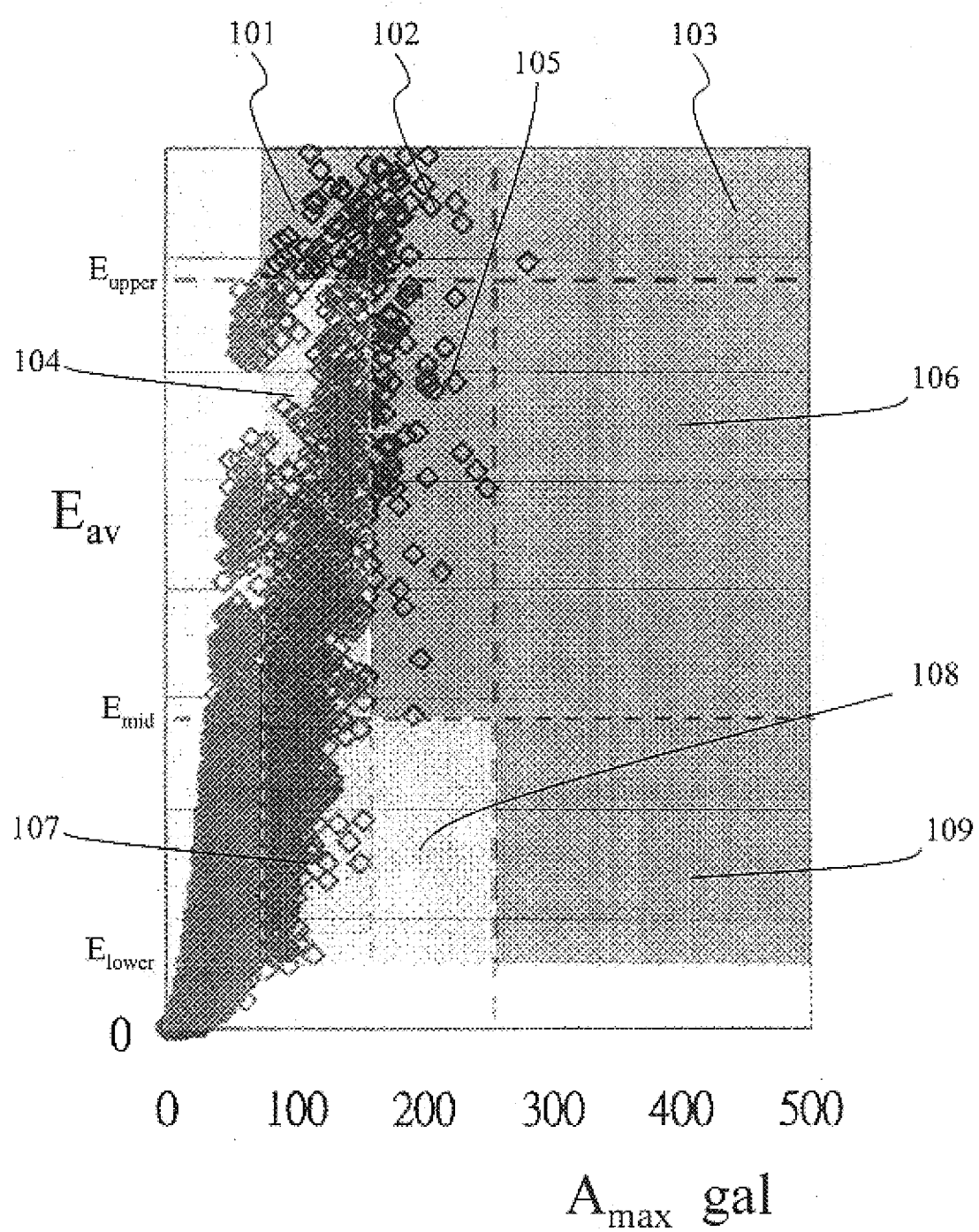
FIG. 1 is a graph for the maximum acceleration values and energy indexes of earthquake data.

The relative data obtained during an earthquake (such as that the earthquake happened on Sep. 21, 1999 in Taiwan) can be sorted out into several useful parameters, including the maximum acceleration value, shaking energy index, the number of times that the acceleration threshold is exceeded, maximum velocity, maximum displacement, and shaking frequency. These six parameter all aid in judging the strength of an earthquake. That is to say, these six parameters can be measured while an earthquake is happening, and the strength of the shaking and whether it is actually an earthquake can be judged through comparisons of these parameters and the reference values of these parameters.

First, the maximum acceleration value and shaking energy while an earthquake is happening can be used to do basic occurrence judgment of an earthquake. These two coordinates of parameters can be seen in FIG. 1, which shows the waveform of the Taiwanese 921 Earthquake, which is a characteristic distribution graph obtained from the analysis of the data of the change of acceleration in directions from east to west and from south to north with 900 different time lengths of 60–180 seconds observed in all Taiwanese observation stations. The traditional technology uses only acceleration values (class, x-coordinate) to judge earthquake occurrence. Another important parameter, shaking energy index (y-coordinate), is always ignored. But, serious damage is still caused even if acceleration values are not large when the energy index is very high. Therefore, using the two parameters mentioned above can mark off a plurality of occurrence ranges of strong shakings. They are a first zone 101, a second zone 102, a third zone 103, a fifth zone 105, a sixth zone 106 and a ninth zone 109.

Moreover, as shown in FIG. 1, for the sake of safety, several safe ranges can be built among a fourth zone 104, seventh zone 107 and eighth zone. A strong shaking can be judged in these safe ranges.

Finally, for excluding shakings not yielded from an earthquake (such as manual vibration), another standard for judgment, i.e. shaking frequency, can be added. Because the shaking frequencies of earthquakes are between 0–20 Hz, a shaking whose frequency is beyond this frequency can be regarded as interference.

Besides, the other three parameters mentioned above, i.e. times for exceeding the acceleration threshold, maximum velocity and maximum displacement, can also be judgment rules of strong shaking occurrence. The maximum velocity and maximum displacement in tall buildings are greater than those on the ground with a same class of earthquake. The three parameters mentioned above can be brought into consideration when judging earthquake occurrence.

Reference values corresponding to the six parameters can be obtained from earthquake data at all places in the world. Therefore, to suit the measurement to local conditions, basic earthquake parameters can be obtained to use as the standard values of a strong shaking judgment. Only earthquake parameter reference values at all places are taken as the comparison basis. The occurrence strength of an earthquake and whether it happens at every place in the world can be judged immediately.

Next, a judgment method and device for strong shaking occurrence according to the invention can be described with the accompanying drawings.

First, an accelerometer is used in the invention to monitor waveform change of an earthquake in order to obtain the six earthquake parameters, and a micro controller unit (MCU) in which a judgment logic program is installed processes strong shaking waveform characteristics analysis, calculates and analyzes all earthquake characteristic parameters mentioned above from an acceleration change in a certain preset time frame, and then uses the six characteristic parameters to process the strong shaking judgment.

Figure 2:
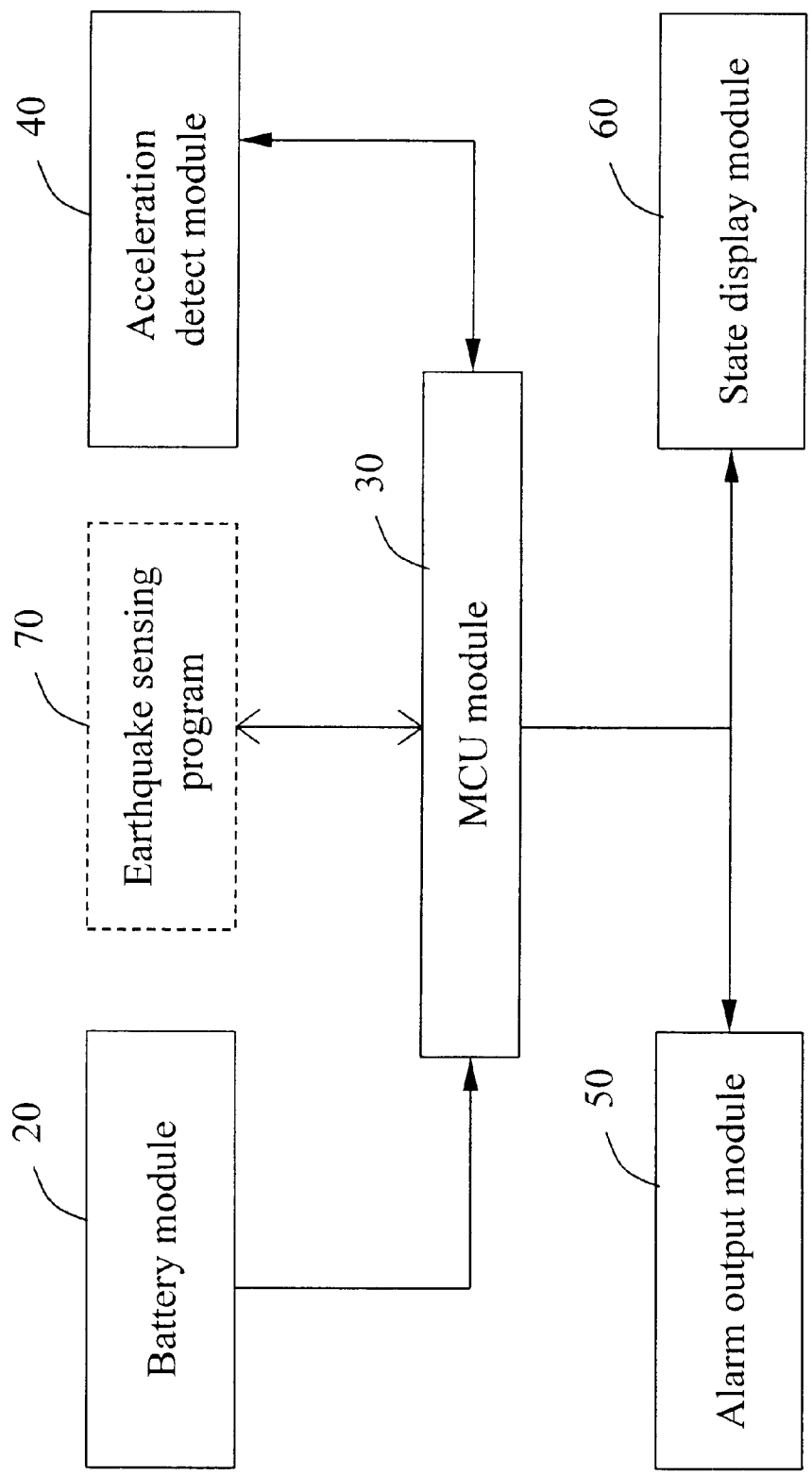
FIG. 2 is a schematic view of a strong shaking judgment device according to the invention.

Please refer to FIG. 2, which shows a block diagram of a strong shaking judgment device module. It comprises a battery module 20, micro controller module 30, acceleration sensor module 40, alarm output module 50, state display module 60 and earthquake-sensing program 70. Here, the battery module 20 provides electricity needed for the micro controller module 30 and acceleration sensor module 40. The acceleration sensor module 40 records earthquake waveforms (acceleration change), and transmits data into the micro controller module 30. The micro controller module 30 reads the earthquake-sensing program 70, and analyzes the six characteristic parameters of an earthquake waveform and compares them with the earthquake parameter reference values to judge whether an earthquake is occurring, and deliver the result to the state display module 60 or the alarm output module 50.

Among these, the micro controller module comprises a micro controller unit, an earthquake-sensing program 70 and a memory unit recording earthquake reference parameters. And, an LCD or alphanumeric display device can be used in the state display module 60. A buzzer can be used in the alarm output module 50. Or, signals can be output to outside facilities to process safety measures such as closing electric power supply.

Figure 3:
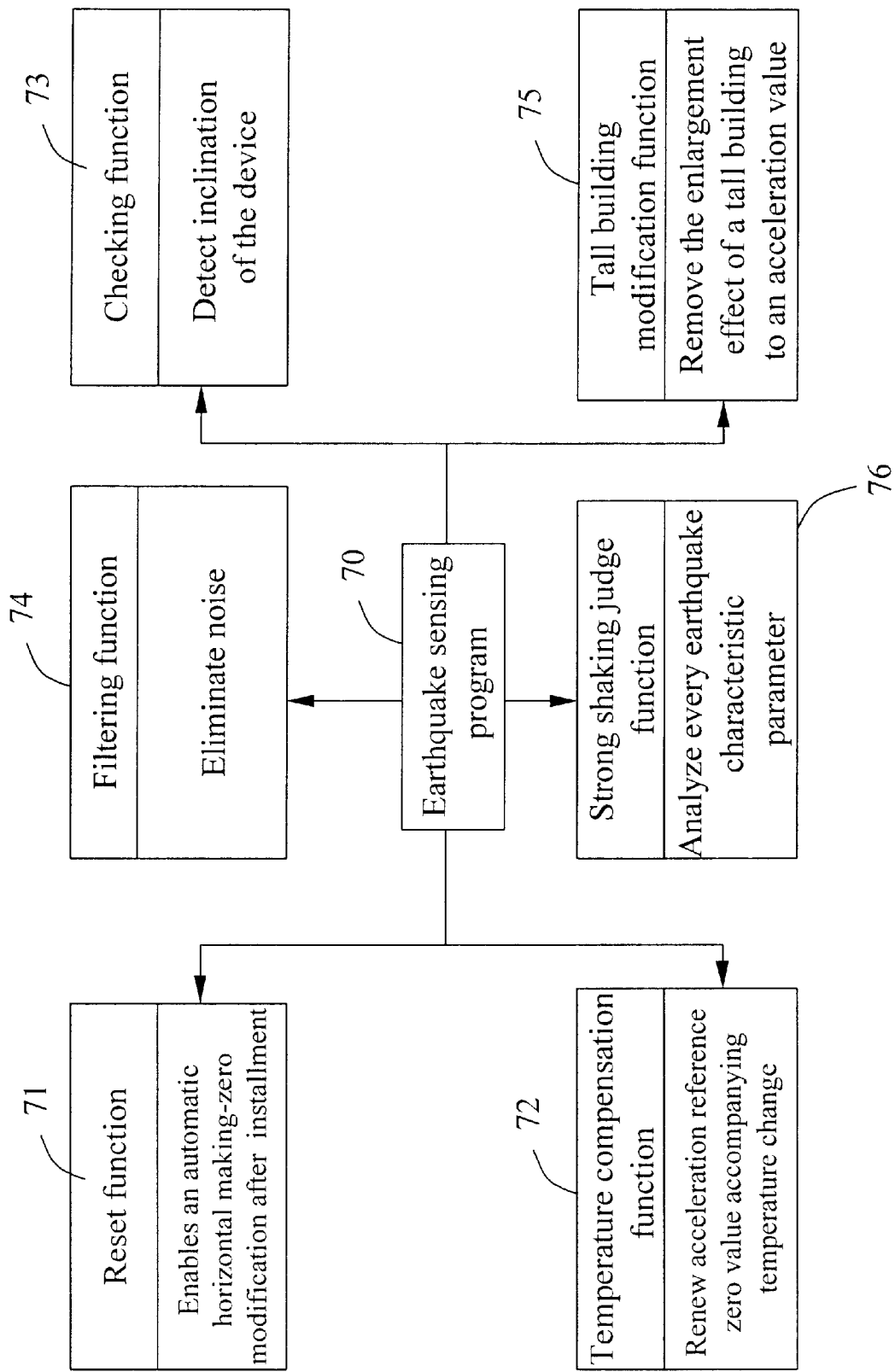
FIG. 3 is a function block diagram of a strong shaking judgment method according to the invention.

The earthquake-sensing program 70 mainly comprises several functions, i.e. a reset function 71, temperature compensation function 72, checking function 73, filtering function 74, tall building modification function 75 and strong shaking judgment function 76. Please refer to FIG. 3, which shows a function block diagram illustrating a strong shaking judgment method according to the invention. Each function is described as follows.

The reset function 71 enables an automatic horizontal making-zero modification after installment. The strong shaking judgment device may be slightly inclined when it is installed. If its oblique angle is in a tolerable range, then the reset function averages accelerations of gravity for a long period of time, and takes the average value as the zero value of accelerations, processing a horizontal making-zero modification.

The temperature compensation function 72 is used to eliminate the influence of temperature to an acceleration sensor reading. The reading of an accelerometer has a slight deviation accompanying temperature change, so that the acceleration reference zero value will be renewed accompanying temperature change in order to compensate temperature effect.

The checking function 73 is used to detect inclination. If an oblique angle is too large, the device is judged to be inclined and an alarm is emitted.

The filtering function 74 is used to eliminate noise, to eliminate earthquake misjudgment caused from high frequency shaking.

The tall building modification function 75 is used to remove the enlargement effect of a tall building to an acceleration value.

The judgment function 76 is used to analyze every earthquake characteristic parameter in order to verify the occurrence of an earthquake.

The invention can detect the occurrence of an earthquake through the functions mentioned above. Among these, the actions of the reset function 71, temperature compensation function 72 and checking function 73 are completed before the occurrence of a shaking, and the other three functions operate when the shaking happens.

Next, the strong shaking judgment method according to the invention is described as follows through a process in a practical application of the invention; i.e. how to achieve the filtering function 74, tall building modification function 75 and strong shaking judgment function 76.

Figure 4:
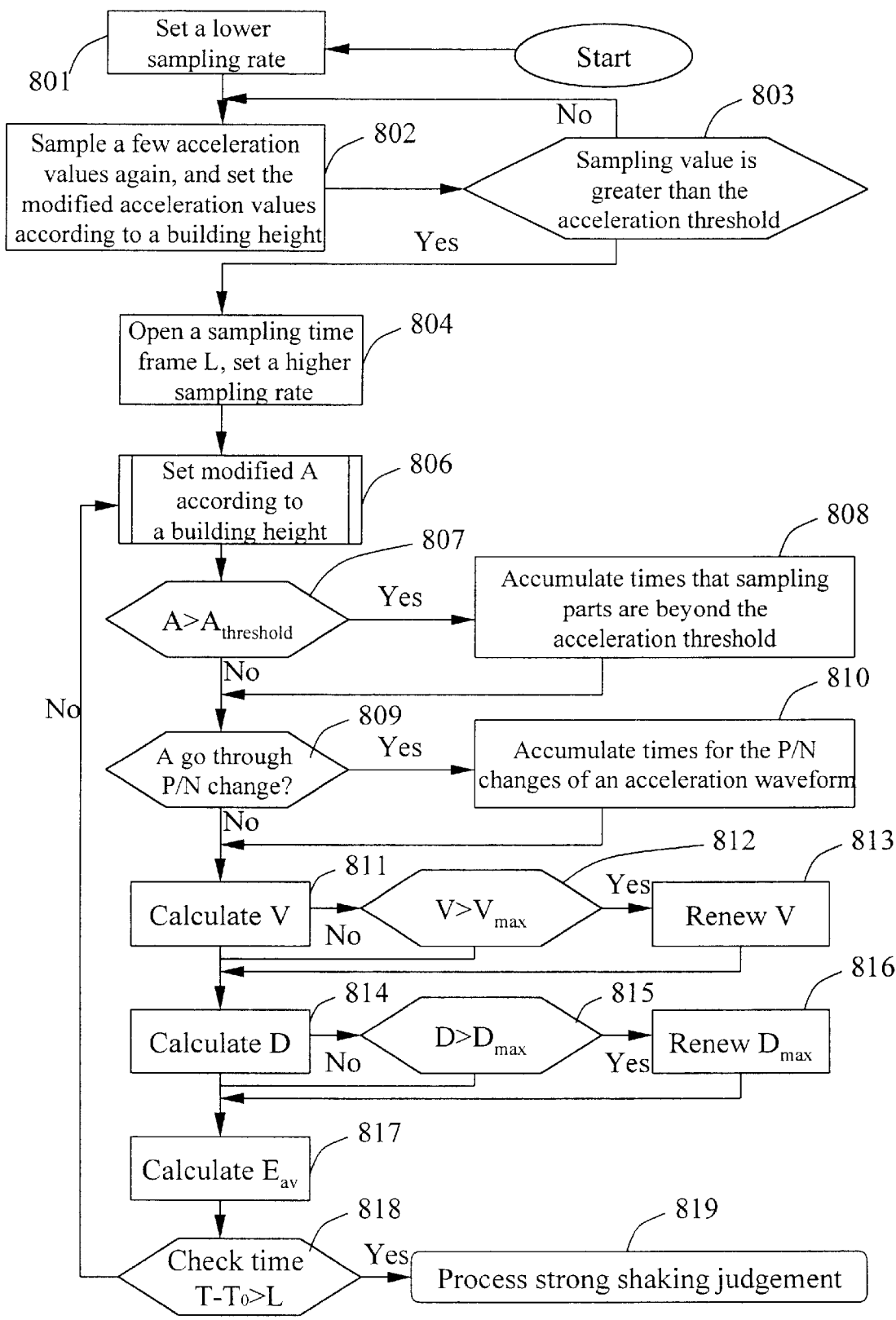
FIG. 4 is a flow chart for selecting earthquake parameters while an earthquake is occurring according to the invention.

To judge whether a strong shaking happens, first, pick acceleration changes in a certain preset time frame, and calculate and analyze every kind of earthquake characteristic parameter. Next, the earthquake judgment method according to the invention is used to judge the occurrence of an earthquake. Please refer to FIG. 4, which is a flow chart for selecting earthquake parameters when a shaking happens according to the invention.

First, set a lower sampling rate (step 801). Next, sample a few acceleration values again, and set the modified acceleration values according to a building height (step 802) Check whether the sampling value is greater than the acceleration threshold (step 803). If it is not, continue to use a low sampling rate to pick an acceleration value at the next point; if it is, open a sampling time frame L, set a higher sampling rate (step 804), start to do calculation and analysis of an acceleration change, and start to count time T0 (step 805) simultaneously. The description mentioned above is an achievement of the filtering function 74 and tall building modification function 75. Pick an acceleration value at a point every time. The following actions are processed after a modified acceleration value is set according to a building height (step 806).

(1) check whether an acceleration value A is beyond the acceleration threshold (step 807); if it is, accumulate times that sampling parts are beyond the acceleration threshold (step 808).

(2) check whether the acceleration value A goes through positive and negative (P/N) change (step 809) (positive value is changed to negative, or negative value is changed to positive); if it does, accumulate times for the positive and negative changes of an acceleration waveform (step 810).

(3) calculate a velocity V (step 811) and check whether the velocity V is the maximum velocity (step 812); if it is, renew the maximum velocity record (step 813).

(4) Calculate displacement D (step 814) and check whether the displacement D is the maximum displacement (step 815); if it is, renew the maximum displacement record (step 816).

(5) Calculate an energy index (step 817).

Pick, calculate and analyze the acceleration change repeatedly until the time frame period ends (step 818). The six characteristic parameters of an earthquake waveform in the time frame can be obtained: the maximum acceleration value (obtained from step 806), times for passing over the acceleration threshold (obtained from step 808), the maximum velocity (obtained from steps 811 and 812), the maximum displacement (obtained form steps 814–816), the shaking energy index (obtained form step 817) and the shaking frequency (obtained from step 810).

After the six shaking characteristic parameters are obtained, they are compared with the earthquake reference parameters. Please refer to FIG. 5. Which illustrates a shaking judgment flow chart according to the invention. The flow chart comprises the following steps: first, obtain the earthquake characteristic parameters obtained from the acceleration change in a time frame to get earthquake waveform characteristic parameters when A is greater than $A_{threshold}$ (acceleration value is greater than acceleration threshold) (step 901). Next, judge a non-high frequency and strike noise (step 902). If it is a noise, then go back to step 901; if it is not a noise, then first judge whether the maximum velocity is greater than the safe velocity limit (step 903), whether the number of times (N) passing over the threshold is greater than the lower limit ($N_{low}$) (step 904), then judge whether it is a strong shaking (step 905). The judgment of a noise can be carried out through a filter in the strong shaking judgment device as described above.

On the contrary, if the maximum velocity is not greater than the safe velocity upper limit or the times for passing over the threshold is not greater than the lower limit, then judge whether the maximum displacement is greater than the safe displacement upper limit (step 906). If the maximum displacement is greater than the safe displacement upper limit, judge whether the number of times passing over the threshold is greater than the lower limit (step 907). If it is, then judge whether it is a strong shaking; if it is not, then process the next step, which is to judge whether the maximum acceleration is greater than the acceleration upper limit (step 908). If the maximum acceleration is greater than the acceleration upper limit, then judge whether the energy index is greater than the lower limit (step 909). If the energy index is greater than the lower limit, then judge whether it is a strong shaking (step 905). If the energy index is not greater than the lower limit, then it is not a strong shaking (step 919). If the maximum acceleration is not greater than the acceleration upper limit, then judge whether the maximum acceleration is greater than the acceleration middle limit (step 910).

At the step 910, if the maximum acceleration is greater than the acceleration middle limit, then judge whether the maximum acceleration is greater than the middle limit (step 911). If the energy index is greater than the middle limit (step 911), then it is a strong a shaking (step 905); if the energy index is not greater than the middle limit, then judge whether the energy index is greater than the lower limit (step 912). At step 912, if the energy index is greater than the lower limit, then process conditional earthquake judgment 1 (step 913); if the energy index is not greater than the lower limit, then it is not a strong shaking (step 919). At step 910, if the maximum acceleration is not greater than the acceleration middle limit, the judge whether the energy index is greater than the upper limit (step 914). If it is, then it is a strong shaking (step 905); if it is not, then judge whether the energy index is greater than the middle limit (step 915). At step 915, if the energy index is greater than the middle limit, then process conditional earthquake judgment 2 (step 916). If the energy index is not greater than the middle limit, then judge whether the energy index is greater than the lower limit (step 917). At step 917, if the energy index is greater than the lower limit, then process conditional earthquake judgment 3 (step 918). If the energy index is not greater than the lower limit, then it is not a strong shaking (step 919).

The first of the strong shaking judgment procedures mentioned above is to check whether the maximum velocity and the maximum displacement are beyond the preset safety limits. If they are and the accumulated sampling part exceeds the lower limit of the acceleration limit, then it can be judged that an earthquake has happened (steps 903–904, 906–907). If they are not, then continue judgment procedures. Judgment can be divided into three parts according to the maximum acceleration value:

(1) the maximum acceleration is greater than the preset acceleration upper limit: check whether an average shaking energy is greater than the preset energy lower limit; if it is, then a strong shaking has happened; if it is not, then a strong shaking has not happened (steps 908–909).

(2) the maximum acceleration is greater than the preset acceleration middle limit: the judgment process is divided into three parts according to the quantity of the average shaking energy (step 910–913).

(2.1) the average shaking energy is greater than the preset energy middle limit: a strong shaking has happened.

(2.2) the average shaking energy is greater than the preset energy lower limit: process conditional strong shaking judgment 1.

(2.3) the average shaking energy is smaller than the preset energy lower limit: a strong shaking has not happened.

(3) the maximum acceleration is greater than the preset acceleration lower limit: divide into 4 parts according to the average shaking energy value to process judgment (steps 914–918):

(3.1) the average shaking energy is greater than the preset energy upper limit: a strong shaking has happened.

(3.2) the average shaking energy is greater than the preset energy middle limit: process conditional strong shaking judgment 2.

(3.3) the average shaking energy is greater than the preset energy lower limit: process conditional strong shaking judgment 3.

(3.4) the average shaking energy is smaller than the preset energy lower limit: a strong shaking has not happened.

In fact, the standards of a strong shaking in steps 908–918 are in accordance with the zones divided in FIG. 1, namely, use a figure showing a relation between the maximum acceleration and average shaking energy to process judgment. The third zone 103, the six zone 106 and the ninth zone 109 are strong shaking zones. They are strong shaking zones as judged according to accelerations by the traditional technology. The first zone 101, the second zone 102 and the fifth zone 105 are strong shaking judgment zones added by the invention. The fourth zone 104, the seventh zone 107 and the eighth zone 108 are conditional strong shaking judgment zones; other unmarked shallow color zones are weak shaking judgment zones.

Figure 5:
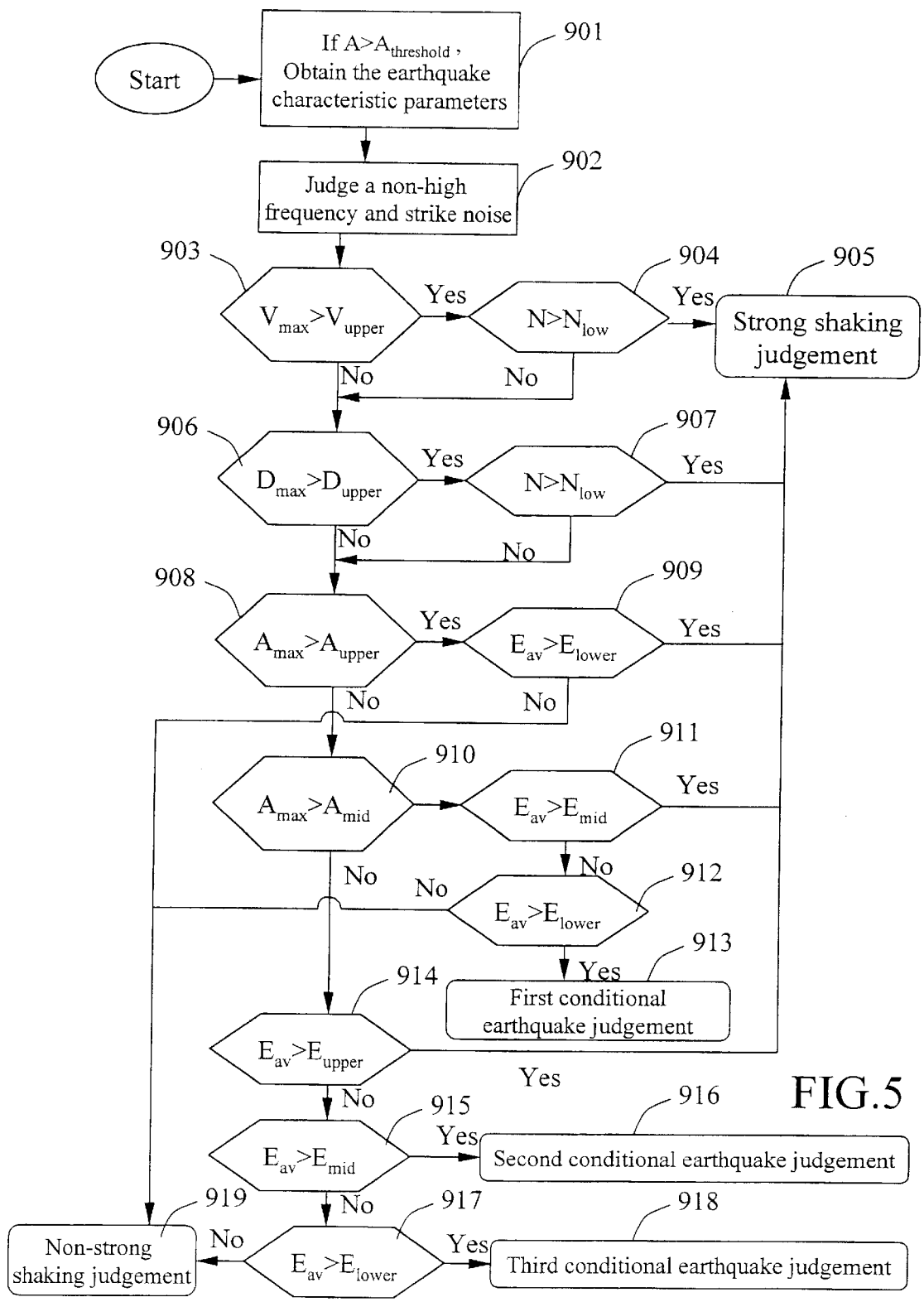
FIG. 5 is a flow chart of a strong shaking judgment according to the invention.

Contrasting FIG. 5 with FIG. 1, steps 908–909 can judge the strong shaking zones of the third zone 103, the sixth zone 106 and the ninth zone 109. Steps 910–913 can judge the strong shaking zones of the second zone 102, the fifth zone 105, and the condition 1 of the eighth zone 108. Steps 914–918 can judge the strong shaking zone of the first zone 101, the conditional earthquake judgment 2 of the fourth zone 104 and the conditional earthquake judgment 3 of the seventh zone 107.

Figure 6:
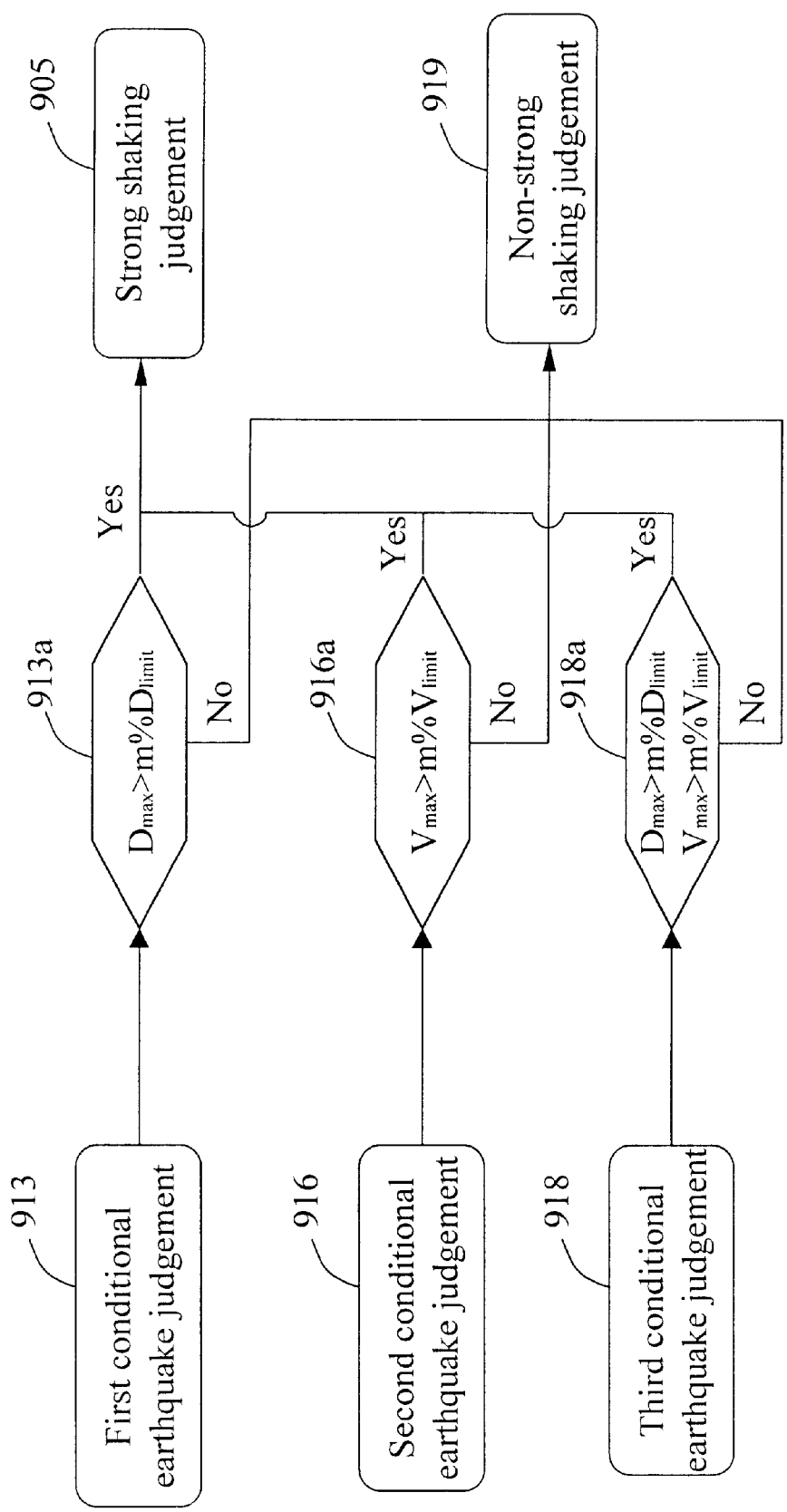
FIG. 6 is a flow chart of a conditional strong shaking judgment according to the invention.

Next, please refer to FIG. 6, which is a conditional judgment flow chart according to the invention. Steps 913, 916 and 918 are for conditional earthquake judgment 1, conditional earthquake judgment 2 and conditional earthquake judgment 3. Conditional earthquake judgment 1 is the eighth zone 108 in FIG. 1. A safety zone judgment can be set in it, namely, to include a judgment condition that checks whether the maximum displacement $D_{max}$ is greater than a safe displacement limit $D_{limit}$ of a specified percentage m (step 913a), such as 60 percent. Conditional earthquake judgment 2 is the fourth zone 104 in FIG. 1. A safety zone can also be set in it, which checks whether the maximum displacement $V_{max}$ is greater than a safe velocity limit $V_{limit}$ of a specified percentage m (step 916a), such as 60 percent. Conditional earthquake judgment 3 is the seventh zone 107 in FIG. 1. A safety zone can be set in it, which checks whether the maximum displacement and maximum velocity are greater than safe limits of a specified percentage m (step 918a), such as 60 percent.

It is noted that the descriptions mentioned above are the preferred embodiments of the invention that are provided for the purpose of illustration only, and are not intended as a definition of the limits and scope of the invention disclosed. Any modifications and variations that may be apparent to a person skilled in the art are intended to be included within the scope of the following claims.

What is claimed is:

1. A strong shaking judgment method for analyzing an acceleration change obtained from an occurrence of a strong earthquake to obtain upper limits, middle limits and lower limits of an acceleration threshold and an energy index, and to judge whether an earthquake happens according to said upper limits of the acceleration threshold and the energy index when a shaking occurs, said method comprising the steps of:

sampling accelerations of said shaking to obtain a maximum acceleration value;

calculating energy of said shaking to obtain an energy value;

comparing said maximum acceleration value and said acceleration threshold, said energy value and said energy index to obtain a strong shaking judgment index; and judging an occurrence of a strong shaking according to said strong shaking judgment index;

wherein said strong shaking judgment index is obtained according to following steps:

assigning said strong shaking judgment index to an occurrence of a strong shaking when said maximum acceleration is greater than said upper limit of said acceleration threshold and said energy value is greater than said lower limit of said energy index;

said strong shaking judgment index is assigned to a non-occurrence of a strong shaking when said energy value is smaller than said lower limit of said energy index;

assigning said strong shaking judgment index to an occurrence of a strong shaking when said maximum acceleration is smaller than said upper limit of said acceleration threshold and greater than said middle limit thereof and said energy value is greater than said middle limit of said energy index;

a first conditional earthquake judgment is processed if said energy value is smaller than said middle limit of said energy index and greater than said lower limit thereof;

said strong shaking judgment index is assigned to a non-occurrence of a strong shaking when said energy value is smaller than both said middle limit and lower limit of said energy index; and assigning said strong shaking judgment index to an occurrence of a strong shaking when said maximum acceleration is smaller than said middle limit of said acceleration threshold and said energy value is greater than said upper limit of said energy index;

a second conditional earthquake judgment is processed if said energy value is smaller than said upper limit of said energy index and greater than said middle limit thereof;

a third conditional earthquake judgment is processed if said energy value is smaller than said middle limit of said energy index and greater than said lower limit thereof;

said strong shaking judgment index is assigned to a non-occurrence of a strong shaking when said energy value is smaller than both said middle limit and lower limit of said energy index.

2. The method of claim 1, wherein said first, second and third conditional earthquake judgments are used to judge said occurrence of strong shaking through comparing a specific percentage of a maximum safe displacement and a maximum safe velocity set by analytical data obtained when said strong earthquake happens and a maximum velocity and a maximum displacement obtained from the shaking;

said strong shaking judgment index is assigned to an occurrence of an strong shaking when said maximum velocity is greater than said specified percentage of said maximum safe velocity or said maximum displacement is greater than said specified percentage of said maximum safe displacement;

said strong shaking judgment index is assigned to a non-occurrence of a strong shaking if said maximum velocity and maximum displacement are all smaller than said specified percentages of said maximum safe velocity and maximum safe displacement.

3. The method of claim 2, wherein said specific percentage is 60 percent.

4. The method of claim 1, wherein said maximum acceleration value is further modified according to a height value when the accelerations of said shaking is sampled.

5. The method of claim 1, wherein the step of sampling the accelerations of said shaking further including the step of: calculating a maximum displacement and a maximum velocity according to said acceleration change.

6. The method of claim 5, wherein an acquirement of said strong shaking judgment index further comprises following steps:

assigning said strong shaking judgment index to an occurrence of a strong shaking if said maximum velocity is greater than said safe velocity;

assigning said strong shaking judgment index to an occurrence of a strong shaking if said maximum displacement is greater than said maximum safe displacement; and comparing said maximum acceleration value and acceleration threshold, said energy value and energy index when said maximum velocity is smaller than said maximum safe velocity and said maximum displacement is smaller than said maximum safe displacement.

7. The method of claim 1, wherein before said step of comparing said maximum acceleration and acceleration threshold, further including a low-pass filtering step, if a frequency of said shaking is greater than said low-pass filtering frequency, a strong shaking judgment is stopped; if a frequency of said shaking is smaller than said low-pass filtering frequency, said comparison step is processed.

8. A strong shaking judgment device utilizing a maximum acceleration threshold value and a shaking energy index obtained when an earthquake happens as a basis for judging whether an earthquake happens when a shaking happens, said device comprising:

a battery module, for supplying electricity required for said device;

an acceleration sensor module, for sensing an acceleration value of said shaking and to calculate an energy value;

a micro controller module having an earthquake sensing program, for receiving said acceleration value, comparing said maximum acceleration threshold value and shaking energy index with said acceleration value and energy value to judge an occurrence of a strong shaking, and sending out a warning signal and state signal;

an alarm output module, for receiving said warning signal to send out an alarm; and a state display module, for receiving said state signal and displaying a state of said device, the micro controller uses a strong shaking judgment index which is obtained by the following steps:

assigning said strong shaking judgment index to an occurrence of a strong shaking when maximum acceleration is greater than an upper limit of said acceleration threshold value and said energy value is greater than a lower limit of said energy index;

said strong shaking judgment index is assigned to a non-occurrence of a strong shaking when said energy value is smaller than said lower limit of said energy index;

assigning said strong shaking judgment index to an occurrence of a strong shaking when said maximum acceleration is smaller than said upper limit of said acceleration threshold and greater than a middle limit thereof and said energy value is greater than a middle limit of said energy index;

a first conditional earthquake judgment is processed if said energy value is smaller than said middle limit of said energy index and greater than said lower limit thereof;

said strong shaking judgment index is assigned to a non-occurrence of a strong shaking when said energy value is smaller than both said middle limit and lower limit of said energy index; and assigning said strong shaking judgment index to an occurrence of a strong shaking when said maximum acceleration is smaller than said middle limit of said acceleration threshold and said energy value is greater than said upper limit of said energy index;

a second conditional earthquake judgment is processed if said energy value is smaller than said upper limit of said energy index and greater than said middle limit thereof;

a third conditional earthquake judgment is processed if said energy value is smaller than said middle limit of said energy index and greater than said lower limit thereof;

said strong shaking judgment index is assigned to a non-occurrence of a strong shaking when said energy value is smaller than both said middle limit and lower limit of said energy index.

9. The device of claim 8, wherein said alarm output module is a buzzer.

10. The device of claim 8, wherein said alarm output module outputs an alarm signal to an outside equipment to process turning off electricity of said outside equipment.

11. The device of claim 8, wherein said strong shaking judgment program compares a strong shaking zone defined by said maximum acceleration threshold value and said shaking energy index with said acceleration value and said energy value, then an occurrence of a strong shaking is determined when said acceleration value and energy value fall into said strong shaking zone.

\* \* \* \* \*